May 21, 1957     R. L. LOWE     2,793,072
ANTIGLARE ATTACHMENT FOR VEHICLE VISORS
Filed May 6, 1955
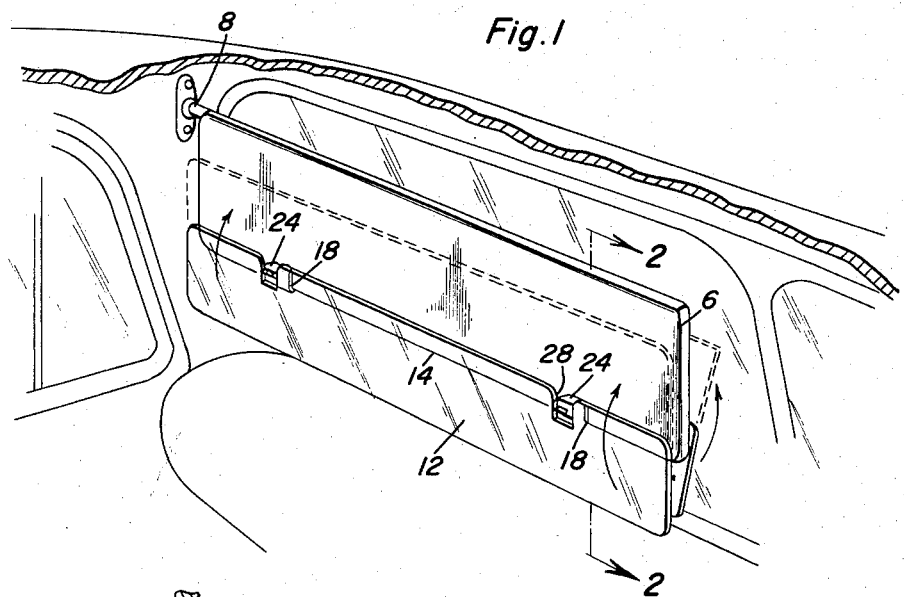
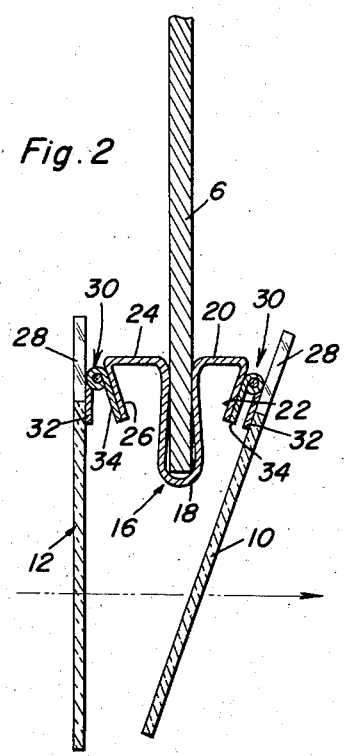
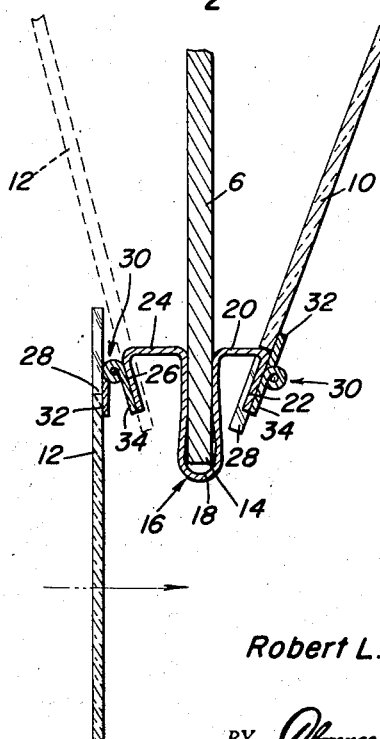
Robert L. Lowe
INVENTOR.

000000000000# United States Patent Office 2,793,072
Patented May 21, 1957

2,793,072
ANTIGLARE ATTACHMENT FOR VEHICLE VISORS

Robert L. Lowe, Detroit, Mich.

Application May 6, 1955, Serial No. 506,518

2 Claims. (Cl. 296—97)

The present invention relates to safety-type interceptors of artificial light, for example, glaring vehicle headlights, and natural lights emanating from the sun and, which unless controlled, are dangerous to drivers of vehicles and all others directly or indirectly concerned. More specifically, the inventive concept has to do with sun visors and the many plastic and equivalent antiglare shields used on windshields by themselves or, as is often the case, as adjuncts to the commonly employed non-transparent sun visor seen on virtually all present day automobiles and the like.

In some respects, the subject matter of the invention may be said to be an improvement on similarly constructed and performing subject matter of invention revealed in a copending application filed on January 26, 1955, and currently identified as Serial No. 484,100.

With a view toward better solving the problem involving the use of antiglare shields which are associated directly with the conventional type sun visor, the instant invention has to do, considering one phase thereof, with two substantially duplicate plastic or equivalent light intercepting panels. These are treated here as colored antiglare shields, and it is an object of the invention to provide one which cooperates with what may be called the front side of the visor and another one which cooperates with the rear side of the visor. They are attached to the lower edge portion of the visor by bracket means, making it possible to use these antiglare shields either one at a time or both together.

It is a further object of the invention to provide the dual arrangement of antiglare shields and hinging and bracketing means supporting the same on the lower edge portion of a sun visor and wherein the forward shield has 10% visibility while the rear shield has approximately 27% visibility and so that by properly utilizing the same singly and collectively, the driver may rely upon reasonably governable results. That is to say, the shield which has the 10% visibility has been adjudged to be about right for driving into the sun, whereas when the sun is overly bright and offers a dazzling glare, both shields may be brought into play. And, by the same token, the one shield, the one with the 27% visibility, will be ideal, it has been discovered, for ordinary night driving requirements where equally dazzling headlight beams are to be contended with.

Another phase of the invention has to do with, briefly described, a non-transparent sun visor adapted for use in cooperation with a vehicle windshield, at least one antiglare shield of a prescribed degree of transparency, an attaching bracket embodying a U-shaped clip detachably mounted on an edge portion of said visor, a cooperating edge portion of said shield having a clearance notch therein, a twin leaf hinge aligned with said notch and having one leaf secured to said shield and the other leaf hingedly movable through and relative to said notch, said bracket having a terminal portion aligned with said notch and secured to said other leaf, whereby said shield may be swung for use through an arc of at least 225 degrees.

Then, too, novelty is predicated, as will be hereinafter clarified, on a sun visor attachment characterized by a panel usable as an antiglare shield, said panel having longitudinally spaced notches formed in and opening through one longitudinal edge thereof, a pair of attaching brackets, one for each notch, each bracket embodying a U-shaped clip adapted to be detachably mounted on an edge portion of said visor, a twin leaf hinge aligned with said notch and having one leaf secured to said shield and the other leaf hingedly movable through and relative to said notch, said bracket having a terminal portion aligned with said notch and secured to said other leaf, whereby said shield may be swung for use through an arc of at least 225 degrees.

Other objects, features and advantages will become more readily apparent from the following description and the accompanying sheet of illustrative drawings.

In the drawings:

Figure 1 is a fragmentary perspective view showing the forward portion of an automobile or the like, illustrating the conventional type of sun visor and the improved antiglare shield means mounted thereon;

Figure 2 is an enlarged section taken on the vertical line 2—2 of Figure 1, looking in the direction of the arrows, and wherein both antiglare shields are in their "down" usable positions;

Figure 3 is a similar view wherein the forward antiglare shield is swung up to an out-of-the-way position while the other one is down, the latter being also seen in phantom lines to show how it, too, has an "up" out-of-the-way position.

Referring now to the drawings with the aid of reference numerals and accompanying lead lines, the numeral 6 designates what has been described as a sun visor. This is bracketed in place and used as is customarily the situation, as at 8. The front antiglare panel or shield of the improved attachment is here denoted by the numeral 10 and is approximately as long as the sun visor. The substantially duplicate antiglare shield which may be distinguished as the rear one is denoted by the numeral 12. These shields are in a duplex arrangement and may be used singly or collectively, as already brought out. The shield 10 may be said to be partially transparent and the degree of visibility or transparency may be described as approximately 10%. The rear shield has been arbitrarily set at a density or visibility characteristic of, let us say, 27%. As already stated, the shield 12 having the 27% vision factor is for night driving. That is to say, it is neither too light nor too dark. The forward shield 10 is about right for driving into the sun, and if desired, both of the shields 10 and 12 may be swung down and opposed in spaced approximate parallelism so as to function conjointly to effectually intercept unusually bright sun rays. An automobile driver may, after experimenting with these shields, learn to use them to best advantage. Simple attaching brackets arranged in longitudinally spaced pairs are employed for detachably and hingedly mounting the two shields on the lower edge portion 14 of the visor. The brackets are identical, and a description of one will suffice for both. That is to say, each bracket is denoted by the numeral 16 and it comprises a substantially U-shaped clip 18 which is resiliently and frictionally engaged over the lower edge portion of the sun visor. There is a right angularly disposed forward portion comprising the bends 20 and 22. A similar right angularly formed portion, at the rear, is made up of the bends 24 and 26. Both shields are also duplicate in that at the respective ends, there is a cut-out or notch 28. Each notch or slot is necessary to permit proper hinging and also the proper swinging of either shield through an arcuate path of approximately 225°, more or less. To accomplish this, there is a hinge, a common butt hinge, for each notch. For example, as shown in the drawings, each hinge is denoted by the numeral 30 and it has one leaf 32 superimposed against and suitably affixed to the shield. The other leaf 34 actually extends into the clearance space of the notch itself. Here, it is fastened to the adjacent bends, as for example, in Figure 3, the hinge leaf 34 at the right is shown secured to the bend 22. In the opposite arrangement, this corresponding leaf 34 is secured to the bend 26. It seems unnecessary to treat these details separately, since they are more or less duplicates of one another. As a matter of fact, it is within the purview of this invention to use either one shield 10 and the bracket means 16 with the right angular bends 22 and 20; or, alternatively, the U-shaped clip 18 and the bends 24 and 26 and shield 12. It is preferred, however, to use these parts in duplication so that the antiglare shields may be employed to greatest advantage, that is, either individually or collectively.

Properly paired clearance notches in the respective shields 10 and 12 and correspondingly arranged and paired attaching and hinging brackets will go to make up the simple and economical overall duplex antiglare shield construction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a non-transparent sun visor adapted for use in cooperation with a vehicle windshield, at least one antiglare shield of a prescribed degree of transparency, an attaching bracket embodying a U-shaped clip detachably mounted on an edge portion of said visor, a cooperating edge portion of said shield having a clearance notch therein, a twin leaf hinge aligned with said notch and having one leaf secured to said shield and the other leaf hingedly movable through and relative to said notch, said bracket having an angularly shaped terminal portion oposed to and aligned with said notch and superimposed upon and fixedly secured to said other leaf, whereby said shield may be swung, when in use on said visor, through an arc of at least 225 degrees.

2. In combination, a standard non-transparent sun visor such as is commonly used on present day automobiles in conjunction with the automobile windshield, a first antiglare shield swingable from an up out-of-the-way position which is then substantially parallel to the front side of said visor, to a down position where, when in use, it depends either wholly or partly below the lower edge portion of said visor, a second antiglare shield similar to the first antiglare shield and also swingable from an up out-of-the-way position rearwardly of and approximately parallel to the visor to a down in use position where it is opposed to and spaced from said first antiglare shield whereby said shields may be selectively used individually or collectively, said first antiglare shield being of a density to provide approximately a ten percent vision, the second antiglare shield being of a density to provide twenty-seven percent vision whereby the shields may be employed depending upon the nature of the light rays which are to be intercepted by the shields, a pair of U-shaped clips mounted on the lower edge portion of said sun visor, each of said clips having forwardly and rearwardly extending bent portions which are disposed in positions at approximate right angles to the forward and rearward surfaces of said sun visor, and hinges interposed between and connecting the respective antiglare shields with their respective forwardly and rearwardly bent portions, the latter being in positions above the lower edge of the sun visor and there being sufficient clearance between the respective upper edges of the antiglare shields and cooperating surfaces of the sun visor to permit said antiglare shields to function without hindrance from cooperating portions of either the sun visor or the clips.

References Cited in the file of this patent

UNITED STATES PATENTS

| | | |
|---|---|---|
| 1,958,934 | Williams | May 15, 1934 |
| 2,166,533 | Oettel | July 18, 1939 |
| 2,204,691 | Olsen | June 18, 1940 |
| 2,220,429 | Soderberg | Nov. 5, 1940 |
| 2,259,505 | Wisdom | Oct. 21, 1941 |
| 2,492,074 | Thompsen | Dec. 20, 1949 |
| 2,665,166 | Roark | Jan. 5, 1954 |